United States Patent Office 2,777,829
Patented Jan. 15, 1957

2,777,829
UNSATURATED ALKYD RESIN COMPOSITIONS CONTAINING CHOLINE CHLORIDE

Robert Cott Andrews, Benzenville, and Norman G. Peterson, Chicago, Ill., assignors to The Glidden Company, Cleveland, Ohio, a corporation of Ohio No Drawing. Application August 28, 1953,
Serial No. 377,265

12 Claims. (Cl. 260—45.4)

This invention relates to stabilized reactive resin compositions and to their preparation, and more particularly to stabilized reactive resin compositions which contain polymerizable unsaturated alkyd compositions of the type generally known as polymerizable polyesters. It relates specifically to the use of choline chloride as a stabilizer for such resinous compositions and as a polymerization initiator for the catalyzed compositions.

A polymerizable unsaturated alkyd (i. e., a polymerizable alkyd containing $\alpha,\beta$-ethylenically unsaturated "dicarboxylic" acids) is highly advantageous as a starting material for the production of hardened synthetic resins in that it is resinous in character before polymerization, and is fusible at a temperature at which polymerization is not rapid. Moreover, such polyesters can be combined with liquid polymerizable unsaturated essentially-monomeric materials (e. g., styrene) to give highly reactive systems containing no volatile solvent. Such systems are of great commercial value but must be stabilized against premature gelation to permit their manufacture, storage and shipping. Choline chloride is especially advantageous for this purpose.

We have not only discovered that choline chloride is a very effective stabilizer for unsaturated polyesters and for such highly reactive compositions as those in which an unsaturated polyester is dissolved in or otherwise mixed with a liquid copolymerizable monomer, but we have also discovered that its presence aids the subsequent curing of such products in that the stabilized compositions can be catalyzed and then cured readily at relatively low temperatures and without excessive rise of temperature. Moreover, the stabilizer does not discolor the polymerizable compositions to which it is added.

Accordingly, it is one object to provide polymerizable polyesters which are stabilized by choline chloride (with or without other commercially available polymerization inhibitors well-known to the art) against premature gelation during prolonged storage, and to provide methods for preparing same.

A further object is to provide stabilized polymerizable polyester compositions which after being suitably catalyzed, can be readily cured to a resinous state at relatively low temperatures and without excessive rise of temperature.

These and other objects will be apparent from the following description of my invention.

It has heretofore been recognized that linear polyesters of "dihydric" alcohols and "dicarboxylic" acids, at least a portion of the latter being $\alpha,\beta$-ethylenically unsaturated, dicarboxylic acids, were capable of polymerization by addition reaction between the ethylenic groups of a plurality of molecules to form thermoset products. This type of material is widely disclosed, for example, in U. S. Letters Patent Nos. 2,409,633, 2,443,735 to 2,443,741 and 2,450,552.

It has also been suggested to admix liquid, or at least fusible linear polyesters such as are disclosed in the foregoing patents, with ethylenically unsaturated monomers and copolymerize the two by heating the mixture in the presence of a peroxide catalyst. This reaction has been extensively elaborated upon in patents and publications. Typical examples of publications are to be found in Industrial and Engineering Chemistry, December 1939, page 1512, and January 1940, page 64.

The foregoing polymerizable compositions undergo addition reaction, that is reaction at the points of carbon-carbon unsaturation, even in the absence of polymerization catalysts and at room temperature or thereabouts. This is especially true in the case of copolymerizable mixtures of the polyesters and the ethylenically, or vinylically unsaturated monomers. A polyester of maleic or fumaric acid and a glycol such as propylene glycol or diethylene glycol, in the presence of a vinylic monomer such as styrene, unless inhibited, will begin to gel almost at once. This is true even in the absence of polymerization catalysts and at room temperature. A catalyst may be desirable to obtain complete cure of such mixture in a reasonable time, but nonetheless, polymerization will quickly proceed so far in the uncatalyzed mixtures as to prevent or at least interfere with normal casting or laminating operations.

This strong tendency of the copolymerizable mixtures to set prematurely was early recognized (see Ellis Patent 2,255,313). In that patent, it is proposed to improve this property by incorporating $\alpha$-cellulose as a filler.

It has further been proposed to improve the storage characteristics of the copolymerizable mixtures by adding small amounts of stabilizers such as phenolic compounds, e. g., hydroquinone. U. S. Patent 2,409,633 contains such suggestion. However, for many applications, the phenolic compounds alone are poor inhibitors of gelation. They often continue to inhibit the polymerization even when the catalyst is added and the mixture is heated. Therefore, they unduly slow up the reaction and necessitate unduly high curing temperatures. This is objectionable in making castings. The inhibitors also tend to discolor the resins, a feature highly objectionable in the casting art. Castings of substantial size also tend strongly to crack or break in the curing operations. More recently many new and effective stabilizers have been proposed. Stabilizers somewhat similar chemically to choline chloride are disclosed in U. S. Patent 2,593,787, but choline chloride possesses numerous advantages over them.

As pointed out briefly above, the present invention is concerned with the use of choline chloride as the novel stabilizer and initiator. The structure of choline chloride is:

$$[HOC_2H_4(CH_3)_3N]Cl$$

While choline chloride in most instances is sufficiently compatible in the small amounts needed for stabilizing and initiating purposes, we prefer to further improve its solubility and compatibility by esterifying the hydroxyl group of the salt with carboxylic acids contained in the polyester, all without impairing its catalytic effects. This esterification can be effected at the close of the treatment in which the polyester is formed; that is, while the newly-formed essentially linear polyester is still warm. By then heating the polyester mass with a small added amount of choline chloride, the desired esterification can be completed within a few minutes. Alternatively, the choline chloride can be separately heated with polycarboxylic acid until the salt has been reacted sufficiently to form a partial ester therewith; i. e., to leave one or two carboxyls on the polycarboxylic acid. In any case, it is best to perform the esterification of the hydroxyl group of the choline chloride with (or add the equivalent partial ester to) the polyester before any vinylic monomer has been added to the latter or is otherwise present.

The esterified choline chloride, whether prepared in situ or separately, is readily soluble in the linear polyester in the small amounts needed for stabilizing and initiating purposes. When a choline chloride partial ester is prepared apart from the polyester, it can be introduced into the latter in the form of aqueous or organic solvent solutions, or directly without solvents, when the polyester is warm. When choline chloride is added to polyester resins to bring about esterification in situ, the choline chloride should be added to the hot polyester, preferably in the form of a solution or of a paste prepared with a suitable liquid solvent. A clear mass can then be attained readily. However, any method of disseminating the choline chloride through the mass of polyester-containing material can be used. Clear choline chloride-polyester masses are generally preferred, but for many uses, clear disseminations or dispersions are not necessary.

In preparing polymerizable polyester-monomer mixtures, the ingredients of the polyester are generally reacted together in the presence of an organic solvent and after the desired extent of esterification has been obtained, the volatiles are removed by any suitable methods as by vacuum stripping or by sparging with inert gas. When the resulting mass is essentially free of volatiles, but while still hot and fluid, the monomer is added with agitation to prepare a homogeneous solution. The mass tends to polymerize at this stage and must be cooled promptly after addition of the monomer has been completed. By adding choline chloride (with or without other gelation inhibitors, such as quinone, hydroquinone or 4-t-butyl catechol) to the hot polyester before the monomer is added, the danger of gelation can be largely avoided. The continuing heat of the mass and the agitation accompanying the subsequent addition of the monomer enable the choline chloride to become esterified partially with the polyester and to be uniformly dispersed through the resulting polyester-monomer solution. It will be apparent that the incorporation of the choline chloride at this stage makes effective use of the stabilizing properties thereof to prevent undesired polymerization of the polyester-monomer mixture while the latter is hot. The hot mixture hence undergoes little polymerization while it is being prepared and while it is subsequently being cooled to room temperature. Consequently, less drastic cooling of the mixture can be tolerated and a margin of safety is provided in the manufacturing process. When choline chloride is not used, the margin of safety is reduced considerably; e. g., from 4 hours at 200° F. in the presence of 0.1% choline chloride to less than 1 hour at 200° F. in the absence thereof.

It should be noted that choline chloride, unlike other quaternary amine salts, is stable up to temperatures of at least 400° F. and hence can be added to the hot polyester at temperatures which promote prompt solution of the polyester with the monomer. Trimethylbenzyl ammonium chloride, for example, begins to decompose at 285° F.

The cooled resinous product is in a stablized condition and can be stored for several months at atmospheric temperatures without fear of having it gel prematurely to a hard unusable mass. Of course, other stablizers, inhibitors, etc. can be added at appropriate stages in the above procedure (usually when the mass is at lower temperatures than when the choline chloride is added), thereby to yield a finished product which has improved storage life and is ready for shipment to the ultimate consumer.

From the foregoing description of the preparation of a polyester-monomer mixture, it will be evident that one benefit of choline chloride is its stabilizing action on the hot mixture. This is a benefit accuring to the manufacturer.

Benefits accruing to the ultimate consumer are several. For one thing, the choline chloride appears to function as an initiator of polymerization when the polyester or polyester-monomer mixture is catalyzed for curing, as by adding free-radical promoting compounds. Organic peroxides and ozonides are common curing catalysts, and are added by the consumer shortly before he molds or otherwise fashions the resin into its final form. After the resin has been so catalyzed, it is heated (as in a hot mold) and cured. The presence of choline chloride in the resin at this time is beneficial since it permits curing to be effected at lower temperatures than could be used in the absence of the choline chloride. When choline chloride is present, polymerization will occur even at room temperatures. Subsequent examples illustrate this polymerization-initiating quality of choline chloride.

Another benefit stemming from the presence of choline chloride is that during the curing treatment the exothermic liberation of heat is more gradual than in the absence of the choline chloride. This signifies more uniform curing and less tendency of the resinous mass to crack or craze during the curing treatment, and in the case of potting compounds, less tendency of the resin to shrink rapidly and thereby cause damage to the equipment which is being potted. In laminating work it signifies less tendency for internal strains to be set up and hence less warping tendency.

EXAMPLE 1

22.6 moles propylene glycol
10.0 moles maleic anhydride
10.0 moles phthalic anhydride were charged into a flask and reacted in the presence of 8% xylene at reflux temperatures of 320–360° F. The reaction was continued until the acid number reached a value of 50–52. Volatiles were removed under reduced pressure and the material was cooled to room temperature.

EXAMPLE 2

0.1 gram 4-t-butyl catechol was added to 700 grams of the product of Example 1 at 250° F. The material was cooled to 200° F. and 300 grams of styrene was added with agitation. The resulting solution will gel in less than one hour if maintained at 200° F. Consequently, the solution was cooled promptly to room temperature. Samples of this material were then catalyzed as indicated below and gel times determined in a bath held at 125° F.

| Example | Catalyst | Percent Catalyst | Gel Time |
|---|---|---|---|
| 2a | benzoyl peroxide | 1.0 | None in 3½ hrs. |
| 2b | t-butyl hydroperoxide | 0.5 | Do. |
| 2c | t-butyl perbenzoate | 1.0 | Do. |
| 2d | Lupersol DDM [1] | 1.0 | 45 minutes. |

[1] 60% solution of methyl ethyl ketone peroxide in dimethyl phthalate, a proprietary product of the Lucidol Division, Novadel Agene Corp.; Buffalo, New York.

EXAMPLE 3

0.1 gram of 4-t-butyl catechol and a paste of 1.0 gram of choline chloride wetted with 0.25 gram of propylene glycol was added to 700 grams of the product of Example 1 at 250° F. This mixture was held at 250° F. for a period of 15 minutes. The material was then cooled to 200° F. and 300 grams of styrene was added with agitation to effect solution. The resulting solution can be held at 200° F. for as long as 3 hours without gelling. The product was, however, cooled to room temperature and samples thereof were catalyzed as indicated below and catalyzed gel times were determined in a bath held at 125° F.

| Example | Catalyst | Present Catalyst | Gel Time, minutes |
|---|---|---|---|
| 3a | benzoyl peroxide | 1.0 | 87 |
| 3b | t-butyl hydroperoxide | 0.5 | 25 |
| 3c | t-butyl perbenzoate | 1.0 | 49 |
| 3d | Lupersol DDM (see Ex. 2) | 1.0 | 27 |

Note the much shorter gel times obtained with the composition of Example 3 as compared with Example 2 using the same percentages of peroxide catalysts. The t-butyl hydroperoxide-choline chloride catalyst combination is particularly useful for casting work, while the Lupersol DDM-choline chloride combination is especially adapted for use in fibrous reinforcement, room-temperature lay-up work as opposed high pressure-cobalt catalyst accelerator work.

EXAMPLE 4

One mole of choline chloride and one mole of maleic anhydride were placed in a 500 cc. flask fitted with a condenser and a stirrer. With rapid agitation of the contents, the flask was placed in a boiling water bath and maintained at this temperature throughout the reaction. The contents fused forming a viscous liquid which after approximately two hours turned solid. This product was shown to possess a neutralization equivalent of 236 which compares with 237 for the half ester.

EXAMPLE 5

0.1 gram 4-t-butyl catechol and 3.4 grams of a 50% aqueous solution of the product of Example 4 was added to 700 grams of the product of Example 1 at 300° F. The material was cooled to 220° F. and 300 grams styrene added with agitation. The product was then cooled to room temperature. A sample of this material was then catalyzed with 0.5% t-butyl hydroperoxide and placed in a bath at 125° F. At the end of 21 minutes the material had gelled.

EXAMPLE 6

One gram of choline chloride wetted with 0.25 gram of propylene glycol was added to 700 grams of the product of Example 1 at 250° F. This mixture was held at 250° F. for a period of 15 minutes. The mass was then cooled to 200° F. and 300 grams of styrene was added with agitation to effect solution. The solution was then cooled to room temperature. A sample of this solution was next catalyzed with 0.5% t-butyl hydroperoxide and placed in a bath at 125° F. At the end of 14 minutes the sample had gelled. Another sample of the solution (uncatalyzed) was held at 200° F. for four hours without being gelled. A further sample of the solution was combined with 0.1% 4-t-butyl catechol, and this sample could also be held at 200° F. for four hours without gelling.

EXAMPLE 7

1.7 grams of the product of Example 4 was added in powdered form to 700 grams of the product of Example 1 at 300° F. This mixture was held at 300° F. for 10 minutes. The material was then cooled to 200° F. and 300 grams of styrene was added with agitation to effect solution. The product was then cooled to room temperature. A sample of this material was then catalyzed with 0.5% t-butyl hydroperoxide and placed in a bath at 125° F. At the end of 8 minutes the material had gelled.

While the polyester compositions are now well-known in the art and constitute none of the novelty in this invention, the following description of the various ingredients which can be used in preparing polymerizable polyesters is given to ensure a full disclosure of the subject matter to which the invention relates. The various patents and publications referred to hereinabove are here incorporated by reference to supplement the following description.

*Polymerizable unsaturated alkyd*

Any unsaturated alkyd whose molecule contains a plurality of polymerizably reactive $\Delta^{2,3}$-enedioyl groups that is polymerizable into an infusible resin at ordinary molding temperatures, or any mixture of such alkyds with one another or with one or more other materials which may or may not be polymerizable, may be used in the practice of the present invention. The polymerizable unsaturated alkyd may be a limpid liquid of very low viscosity, or a tacky, viscous liquid, or may be of any consistency depending upon the materials used in its preparation and the degree to which they are reacted.

A polymerizable unsaturated alkyd used in the practice of the invention is prepared by reaction of one or more polyhydric alcohols with one or more polycarboxylic acids having in the molecule at least one polymerizably reactive $\Delta^{2,3}$-enol group, having the structure

Thus, the polymerizable alkyd is one having polymerizably reactive $\Delta^{2,3}$-enoyl groups contained in dioyl radicals (connecting polyhydric alcohol residues through ester linkages), which dioyl radicals may therefore be defined as $\Delta^{2,3}$-enedioyl radicals. The proportion of polyhydric alcohols having more than two hydroxy groups, such as glycerol or pentaerythritol, and the proportion of polycarboxylic acids having more than two carboxy groups, such as citric acid, preferably is small so that in the production of the alkyd there may be maximum esterification of the hydroxy and carboxy groups without attainment of excessive viscosity (i. e., through cross-linking). For the purpose of the instant invention, it is to be understood that the term "unsaturated alkyd" means an alkyd that is polymerizable into an infusible or high melting point resin; so that proportions of unsaturated components should be such that the alkyd contains an average of at least two double bonds per molecule.

The present invention is applicable to all polymerizable unsaturated alkyds. Preferably, the alkyd is an ester of a glycol with a dicarboxy alkene having from four to five carbon atoms, in which the carboxy radicals are attached to adjacent carbon atoms (i. e., maleic, fumaric, itaconic, citraconic or mesaconic acid). However, as long as the $\Delta^{2,3}$-enoyl groups are polymerizably reactive, the polycarboxylic acid is not necessarily a hydrocarbon dicarboxylic acid but may contain any radicals (e. g., chloro groups) which do not render ethylene groups of the $\Delta^{2,3}$-enoyl groups polymerizably non-reactive. The alkyd may be an ester of a polycarboxylic acid with any glycol, such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (in either the α or β position), such as monoformin or monoacetin, any monoether of glycerol with a monohydric alcohol, such as monomethylin or monoethylin, or any dihydroxy alkane in which the hydroxy radicals are attached to carbon atoms that are primary or secondary or both, in the series from dihydroxy butane to dihydroxy decane. Also the polyhydric alcohol used may be one whose molecule has two or three free hydroxy groups and consists of an ether of one or two molecules of allyl or methallyl alcohol with one molecule of a polyhydroxy compound such as glycerol, pentaglycerol, pentaerythritol, butantetrol- 1,2,3,4, a trihydroxy normal alkane having from four to five carbon atoms such as butantriol-1,2,3, or a monoalkyl ether of pentaerythritol or butantetrol-1,2,3,4 in which the alkyl radical has from one to four carbon atoms and has from one to two hydrogen atoms attached to the same carbon atom as the ether linkage, such as the monomethyl or monoisobutyl ether of pentaerythritol.

Part of the unsaturated dicarboxylic acid may be replaced by a saturated dicarboxylic acid, such as any normal acid in the series from oxalic acid and malonic acid to sebacic acid, or any benzene dicarboxylic, naphthalene dicarboxylic or cyclohexane dicarboxylic acid, or diglycolic, dilactic or resorcinol diacetic acid.

In the practice of the invention the preferred polymerizable unsaturated alkyds are the so-called "linear" alkyds, i. e., those which have very little cross-linking in the alkyd molecules. Such alkyds are formed mainly by esterification of a dihydric alcohol and a dibasic acid. Of course, such alkyds are really only "substantially" linear since it is not possible to avoid all cross-linking, at least through the unsaturated bonds in the alkyd molecules. In fact, a linear (or substantially linear) alkyd may be obtained even though in the preparation of such alkyd a small proportion of the dihydric alcohol (e. g., less than about 5 mol percent of the alcohol) is replaced by a polyhydric alcohol containing more than two alcohol radicals, such as glycerol or pentaerythritol, or a small proportion of the dibasic acid (e. g., less than about 5 mol percent of the acid) is replaced by a polybasic acid containing more than two acid radicals, such as citric acid. The preferred linear alkyd for use in the practice of the invention is prepared by carrying out the esterification reaction substantially to completion (i. e., to an acid number of less than about 40) without permitting substantial (addition) polymerization to take place.

The molecular weight of polymerizable unsaturated alkyds for use in the practice of the invention may vary over a wide range, depending upon the initial reacting ingredients and upon the degree of reaction obtained in the preparation of the alkyds. An alkyd used in the practice of the invention may have a molecular weight ranging from as low as about 500 to as high as about 5000, but ordinarily the molecular weights of preferred polymerizable unsaturated alkyds used in the present invention are in the lower portion of the range; for example, the molecular weight of an alkyd prepared from ethylene glycol, maleic anhydride and small amounts of propylene glycol and phthalic anhydride usually is within the range from about 700 to about 2000.

The number of repeating units in a polymerizable unsaturated alkyd chain, i. e., the number of acid and alcohol residues in the chain-like molecules of the alkyd, may also vary, and alkyds having a high molecular weight have correspondingly long chain molecules. In general, in a polymerizable alkyd used in the practice of the invention the number of repeating units in the alkyd chains may range from about 3 to about 25. However, in preferred alkyds used in the present invention there are usually from about 4 to about 15 units in the alkyd chains. Assuming that there is substantially no cross-linking in such polymerizable unsaturated alkyds and that equivalent quantities of, for example, glycol and maleic acid are employed, the number of olefinic unsaturations attached to carbon atoms in the chains of such polymerizable alkyds is, of course, merely the number of acid residues in the alkyd chain. However, if part of the maleic acid is replaced by a saturated acid in the preparation of a polymerizable alkyd, the number of olefinic unsaturations is lower in proportion to the amount of saturated acid employed, even though the number of acid and alcohol units in the chain remains about the same. Other properties of the unsaturated alkyd, such as solubility in various solvents, also may be varied by selecting various reacting ingredients and varying their proportions. The infusibility, hardness and inertness of the product obtained by polymerization of the alkyd may be increased by varying the initial reacting ingredients to increase the average number of olefinic double bonds per molecule of the polymerizable alkyd.

In the preparation of the polymerizable unsaturated alkyd, any of the usual modifiers such as monobasic acids, monohydric alcohols and natural resin acids may be added. The larger the proportions of monobasic acids and monohydric alcohols, the lower is the average number of acid and alcohol residues in the resulting alkyd molecules, and the lower is the viscosity of the alkyd. On the other hand, the more nearly equal the molecular proportions of dibasic acid and dihydric alcohol, the greater is the average number of residues in the resulting alkyd molecules, and the greater is the viscosity. The proportions of ingredients used are those proportions that produce a polymerizable alkyd of the desired viscosity. In the practice of the invention it is desirable that the proportion of monobasic acids and monohydric alcohols be kept low enough to allow substantial growth of the unsaturated chain-like molecules during preparation of the unsaturated alkyds, since the presence of a substantial proportion of such monobasic acids and monohydric alcohols retards the chain growth of the alkyds and produces alkyds which may not harden satisfactorily.

The effect of the addition of a small proportion of a monohydric alcohol or a monobasic acid upon the chain growth of an alkyd is dependent to a great extent upon the degree of reaction attained before such a monofunctional acid or alcohol is added. For example, if added at the beginning of the reaction of a dibasic acid with a dihydric alcohol, each molecule of the monofunctional ingredient which reacts with a difunctional acid or alcohol stops the growth of the alkyd chain in one direction so that long chain molecules of the alkyd are difficult to obtain under such conditions. However, if added when the reaction of dibasic acid and dihydric alcohol is almost complete so that fairly long chains have already been built up, the monofunctional ingredient merely esterifies those end groups present in the existing alkyd chains and, therefore, only a small amount may be incorporated in the alkyd without having any deleterious effect upon the final product.

However, if monocarboxylic acid is first esterified with polyhydric alcohol in such proportions as to leave two reactive hydroxyls on the alcohol radical, such a product can be used as the equivalent of any true diol. Likewise, if monohydric alcohol is first esterified with polycarboxylic acid in such proportions as to leave two carboxyls on the acid radical, this product can be used as the functional equivalent of a true dicarboxylic acid. In this way extensive modification through such monofunctional acids and alcohols can be achieved.

The point to which the reaction of the ingredients is carried in the preparation of the polymerizable alkyd is simply that point at which the product has the desired consistency. The consistency or viscosity of the alkyd (prepared by reaction under conditions which prevent any appreciable addition polymerization) varies directly with the average number of acid and alcohol residues in the molecule.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of said catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the alkyd, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

Any desired anti-oxidant such as hydroquinone, pyrogallol, tannic acid or any aromatic amine, such as aniline or phenylene diamine may be employed as an inhibitor.

The preparation of the unsaturated alkyd preferably is carried out in an atmosphere of an inert gas such as carbon dioxide, nitrogen or the like, in order to prevent cross-linking through addition polymerization as well as to prevent darkening or to make it possible to obtain a pale or colorless product. Bubbling the inert gas through the reaction ingredients is advantageous in that the gas serves the added functions of agitation and of expediting the removal of water formed by the reaction. Exclusion of oxygen is desirable not only because oxygen causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

A polymerizable alkyd may be prepared by the following procedure:

A three-necked flask is employed in which 5.4 mols of maleic anhydride and 5.4 mols of diethylene glycol are mixed together. The flask is then fitted with a thermometer, a tube leading to a condenser and an inlet tube through which is introduced a moderate stream of carbon dioxide, and is lowered into an oil bath at a temperature of 210° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction. After 8 hours at such temperature, an alkyd is obtained in the form of a stiff liquid having an acid number of 18. If ethylene glycol were substituted for the diethylene glycol in the foregoing procedure, it would be difficult to reduce the acid number below 40 without causing polymerization, and the product would be a very thick gum.

Alternatively, this first procedure, as described in the foregoing paragraph, may be employed except that 1.5 instead of 6.4 mols of maleic anhydride and 1.5 instead of 5.4 mols of diethylene glycol are used together with an amount of hydroquinone equal to 0.2 percent of the weight of the reacting ingredients; and reaction is continued for 6¼ hours. The resulting alkyd is a moderately stiff liquid having an acid number of 11.

A further procedure that may be used is the same as the first procedure except that 2 instead of 5.4 mols of maleic anhydride and 2.1 instead of 5.4 mols of diethylene glycol are used; and the reaction is carried out for 4½ hours to produce a stiff liquid having an acid number of 14.

Another type of polymerizable alkyd may be prepared by a procedure that is the same as the first procedure except that 3 instead of 5.4 mols of maleic anhydride and 3.3 instead of 5.4 mols of diethylene glycol are used together with an amount of hydroquinone equal to .09 percent of the weight of the reacting ingredients and an amount of p-toluene sulfonic acid equal to 0.18 percent of the weight of the reacting ingredients; and the reaction is carried out for four hours at 200° C. to produce a stiff liquid having an acid number of 10.6.

As a further alternative, the first procedure may be employed except that the amount of maleic anhydride employed is 6 instead of 5.4 mols; the diethylene glycol is replaced by 6 mols of ethylene glycol; a slower stream of carbon dioxide is used; and the ingredients are kept in an oil bath at 220° C. for 5½ hours. The resulting alkyd is a very thick gum having an acid number of 53.

A polymerizable alkyd may also be prepared by a procedure that is the same as in the preceding paragraph except that the maleic anhydride is replaced by 5 mols of fumaric acid; the ethylene glycol is replaced by 5 mols of diethylene glycol; and the reaction is continued for 8¼ hours. The resulting alkyd is a stiff liquid having an acid number of 23. If in the foregoing procedure the diethylene glycol were replaced by an equimolecular proportion of ethylene glycol and half of the fumaric acid were replaced by an equimolecular proportion of phthalic anhydride, the product would be a hard brittle solid. The substitution of fumaric acid for maleic anhydride increases the length of time required to reach a given acid number at a given temperature. However, the accelerating effect of an acid catalyst upon the esterification is greater when fumaric acid is used. When fumaric acid is employed, other conditions being the same, the resulting alkyd tends to be more viscous and greater care is necessary in order to prevent premature polymerization.

As further variation, the first procedure may be used except that the maleic anhydride is replaced by 1.5 mols of fumaric acid; the amount of diethylene glycol employed is 1.5 instead of 5.4 mols; and the temperature is varied between 200 and 220° C. After the reaction has been continued for 2½ hours, the acid number is 73. After 6 hours, the product is a stiff liquid having an acid number of 41.

A polymerizable alkyd may also be prepared by a procedure that is the same as that of the preceding paragraph except that p-toluene sulfonic acid (1.5 grams) is added to the initial ingredients; and reaction for only 2½ hours instead of 6 hours is required to produce a stiff liquid having an acid number of 41.

A procedure that may also be used is the same as that of the next to the last paragraph except that the fumaric acid is replaced by 3.3 mols of maleic anhydride; the amount of diethylene glycol used is 3.0 instead of 1.5 mols; 1.5 grams of p-toluene sulfonic acid and 1.3 grams of hydroquinone are added to the initial ingredients; and the reaction is carried out for 3 hours to produce a limpid liquid having an acid number of 26.

A polymerizable alkyd may be prepared by a procedure that is the same as the next to the last paragraph except that 3 instead of 1.5 mols of diethylene glycol are used; and the reaction is carried out for 3 hours at temperatures ranging from 200–210° C. to produce a stiff liquid having an acid number of 12.

A further procedure that may be used is the same as that of the next to the last paragraph except that the hydroquinone is omitted; and reaction for 5 hours is required to produce a stiff liquid having an acid number of 28.

Another procedure that may be used is the same as the procedure of the next-to-the-last paragraph except that the weight of p-toluene sulfonic acid is equal to 0.18 percent of the weight of the reacting ingredients; an amount of hydroquinone equal to 0.09 percent of the weight of the reacting ingredients is added at the start of the reaction; and reaction is carried out at 200° C. for 5 hours to produce a stiff liquid which has an acid number of 10.1.

*Polymerizable unsaturated monomeric substance*

Although a polymerizable unsaturated alkyd may be used alone as the polymerizable binder in the practice of the present invention, it is often desirable to incorporate a polymerizable unsaturated liquid substance (or mixture of liquid substances) having at least one polymerizably reactive $CH_2=C<$ group per molecule and having a boiling point above 80 degrees C. Although such substance may be partially polymerized before use, it is preferable that such substance be a monomer, and it is desirable that it have a plurality of polymerizably reactive $CH_2=C<$ groups per molecule. It is preferred also that such substance be copolymerizable with the unsaturated alkyd used in the practice of the invention. At molding temperatures such substance aids in curing by cross-linking straight chain alkyd molecules. The combination of the alkyd and such liquid substance usually polymerizes more rapidly than either of such substances alone. When used in the proper proportions, such liquid substance improves the water resistance and insolubility of the final product.

The polymerizably reactive CH₂=C< group or plurality of such groups in the polymerizable unsaturated liquid substance may be contained in radicals of unsaturated acids such as itaconic acid, or in other unsaturated radicals such as vinyl and allyl radicals. These unsaturated radicals may be connected directly to carbon atoms in the molecule, or may be connected to the rest of the molecule by ester, ether or amide linkage.

A polymerizable unsaturated monomeric substance whose molecule contains only one polymerizably reactive CH₂=C< group may be a vinyl compound such as styrene, or p-methyl styrene, 2,4-dimethyl styrene, 2,3-dimethyl styrene, 2,5-dimethyl styrene, isopropenyl toluene, vinyl napthalene, vinyl benzoate, vinyl dibenzofuran or acrylonitrile; or an alkyl ester or the amide of a monobasic acid whose molecule contains a CH₂=C< group or the aldehyde corresponding to such an acid, such as methyl acrylate, methyl methacrylate, isobutyl methacrylate, methacrolein, acrolein, acrylamide, or methacrylamide; or an ester of a monohydric alcohol whose molecule contains one ethylenic double bond with a saturated monobasic acid, e. g., allyl lactate.

A polymerizable unsaturated monomeric substance whose molecule contains two or more polymerizably reactive CH₂=C< groups may be an ester of a monohydric alcohol whose molecule contains one CH₂=C< group with a monobasic acid whose molecule contains one CH₂=C< group (e. g., allyl acrylate or allyl methacrylate); or an ester or mixed ester of a molecule of a saturated dihydric alcohol with two molecules of a monobasic acid whose molecule contains a CH₂=C< group (e. g., ethylene dimethacrylate, triethylene dimethacrylate, propylene dimethacrylate, hexamethylene dimethacrylate); or an ester or mixed ester of two alcohol molecules each consisting of a molecule of allyl, methallyl or beta-chloro allyl alcohol, with a molecule of any of the dibasic acids listed in Table 1 below.

TABLE 1

| | |
|---|---|
| Maleic acid | Pimelic acid |
| Chloromaleic acid | Suberic acid |
| Bromomaleic acid | Azelaic acid |
| Fumaric acid | Sebacic acid |
| Chlorofumaric acid | Benzene dicarboxylic acid |
| Bromofumaric acid | (o-, m-, or p-) |
| Mesaconic acid | Biphenyldicarboxylic acid |
| Citraconic acid | (all position isomers) |
| Itaconic acid | Naphthalene dicarboxylic |
| Carbonic acid | acid (all position isomers) |
| Oxalic acid | |
| Malonic acid | Cyclohexane dicarboxylic |
| Succinic acid | acid (cis or trans) |
| Glutaric acid | Pyrotartaric acid |
| Adipic acid | Phenyl phosphonic acid |

"Benzene dicarboxylic acid" in the foregoing table includes o-, m-, and p-phthalic acid.

The polymerizable unsaturated monomeric substance may also be an ester of a molecule of one of the dibasic acids listed in Table 1 with one molecule of a saturated monohydric alcohol such as methyl, ethyl, n-propyl, isopropyl, n-butyl, isobutyl, secondary butyl or tertiary butyl alcohol or Cellosolve and one molecule of one of the unsaturated monohydric alcohols hereinbefore described.

The polymerizable monomeric compound may also be an ester or mixed ester of a molecule of a tribasic or other polybasic organic or inorganic acid with three or more monohydric alcohol molecules each having a CH₂=< group. Such monomeric compounds include triallyl tricarballylate, triallyl aconitate, triallyl citrate, triallyl phosphate, trimethallyl phosphate, triallyl cyanurate, and tetrallylsilicate.

The polymerizable monomeric compound may also consist of an ester of two substances that will be described, one of which has a carboxy group and the other of which has an alcoholic hydroxy group. The substance having a carboxy group may have the general formula F—OH, in which F is the acid radical of acrylic or methacrylic acid, or may have the general formula R—O—D—OH, in which R is allyl, methallyl or beta-chloro allyl and D is the divalent acid radical of any of the dibasic acids listed in Table 1. When D is the divalent acid radical if itaconic acid, R may be methyl, ethyl, n-propyl, isopropyl, n-butyl, isobutyl, secondary butyl or tertiary butyl.

The substance having an alcoholic hydroxy group may consist of a compound having the general formula

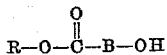

in which R is the monovalent hydrocarbon radical or monovalent chlorinated hydrocarbon radical of any of the alcohols listed in Table 2, below, and in which B is methylene, methyl methylene, or any phenylene radical. The substance having an alcoholic hydroxy group may also consist of a compound having the general formula R—O—D—O—E—OH in which D is the divalent acid radical of any of the dibasic acids listed in Table 1, R has the same significance as in the preceding general formula and E is the divalent radical to which two hydroxy groups are attached in any of the dihydroxy compounds listed in Table 3 below.

TABLE 2

| | |
|---|---|
| Allyl alcohol | Methallyl alcohol |
| Alpha-methyl allyl alcohol | Beta-chloro allyl alcohol |

TABLE 3

| | |
|---|---|
| Ethylene glycol | Hexa-methylene glycol |
| Propylene glycol | Hepta-methylene glycol |
| 1,2-butylene glycol | Octa-methylene glycol |
| 2,3-butylene glycol | Diethylene glycol |
| Tri-methylene glycol | Triethylene glycol |
| Tetra-methylene glycol | Tetraethylene glycol |
| Penta-methylene glycol | o-, m-, or p-Dihydroxy benzene |

Such a polymerizable monomeric carbon compound thus has the general formula

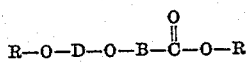

or

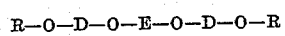

Polymerizable monomeric compounds having the general formula

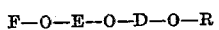

may be prepared by first reacting one molecule of a dihydroxy compound listed in Table 3 with one molecule of the monochloride of a half ester of one of the dibasic acids listed in Table 1 with one of the alcohols listed in Table 2, or in some cases of the half ester itself. (For example, a molecule of allyl chlorocarbonate, which has been prepared by reacting one molecule of allyl alcohol with a molecule of phosgene, may be reacted with a molecule of diethylene glycol.) One molecule of the resulting product may then be reacted with one molecule of the chloride of acrylic or methacrylic acid or in some cases of the acid itself.

Polymerizable monomeric compounds having the general formula

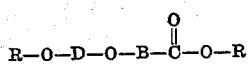

include the diallyl ester of lactocarbonate and the diallyl ester of hydroxy-aceto-carbonate. Other compounds having this general formula, as well as polymerizable monomeric compounds having the general formula

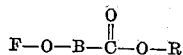

may be prepared by reacting one molecule of an ester of an alcohol listed in Table 2 with a monobasic hydroxy-substituted, chloro-substituted or bromo-substituted acid, such as glycolic acid, chloroacetic acid, lactic acid, alpha-bromo propionic acid or hydroxy benzoic acid (e. g., allyl lactate) with one molecule of a derivative of acrylic or methacrylic acid or with one molecule of a derivative of a half ester of one of the dibasic acids listed in Table 1 with one of the alcohols listed in Table 2. In the case of itaconic acid (Table 1) the half ester may also be a half ester of methyl, ethyl, propyl, isopropyl, n-butyl, isobutyl, secondary butyl or tertiary butyl alcohol.

Polymerizable monomeric compounds having the general formula

R—O—D—O—E—O—D—O—R include: diallyl ethylene glycol dioxalate, diallyl ethylene glycol dicarbonate, diallyl diethylene glycol dicarbonate, diallyl trimethylene glycol dicarbonate, diallyl ethylene glycol disuccinate, diallyl ethylene glycol diadipate, diallyl diethylene glycol dimaleate, dimethallyl diethylene glycol dicarbonate, diallyl diethylene glycol dimalonate, 2-(oxycarballyloxy) ethyl ethyl fumarate and 2-(oxycarbomethallyloxy) ethyl methyl fumarate.

The polymerizable monomeric carbon compound may also consist of an ester of a molecule of any of the dibasic acids listed in Table 1 with two similar molecules (or a mixed ester of a molecule of such a dibasic acid with two dissimilar molecules) each of which is an ester of glycolic, lactic or o-, m-, or p-hydroxy benzoic acid with any of the alcohols listed in Table 2. Such a polymerizable monomeric carbon compound has the general formula

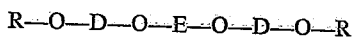

An amino acid such as glycine may be used in place of lactic, glycolic, or o-, m- or p-hydroxy benzoic acid, so that the general formula is then

Such monomeric compounds include: carbonyl bis(methallyl lactate), carbonyl bis(allyl lactate), maleyl bis(allyl lactate), fumaryl bis(allyl lactate), succinyl bis(allyl lactate), adipyl bis-(allyl lactate), sebacyl bis(allyl lactate), adipyl bis(allyl lactate), sebacyl bis(allyl lactate), phthalyl bis(allyl lactate), fumaryl bis(allyl glycolate), carbonyl bis(allyl glycolate), carbonyl bis(allyl salicylate) and oxally bis(allyl glycinate).

The polymerizable monomeric unsaturated compound may also consist of an ether of two similar or dissimilar molecules each consisting of an ester of glycolic, lactic or o-, m- or p hydroxy benzoic acid with any of the alcohols listed in Table 2. Such a polymerizable monomeric carbon compound has the general formula

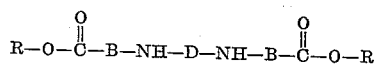

Monomeric compounds having this general formula include: the ester of alcohols listed in Table 2 with diglycolic acid, with diethyl ether alpha, alpha′-dicarboxylic acid, or with any diphenyl ether dicarboxylic acid in which each of the benzene rings has one carboxyl group attached to it. In the preparation of such a compound, an ether of two hydroxy-substituted acid molecules may first be prepared by reacting the sodium derivatives of glycolic, lactic or any hydroxy-benzoic acid with chloracetic or alpha-chlorpropionic acid in accordance with the usual procedure for preparing ethers. The product may then be esterified with any of the alcohols listed in Table 2. If it is desired to prepare a compound of this type whose molecule is an ester of two different alcohols, it may be more convenient to prepare an ester of one of the alcohols listed in Table 2 with glycolic, lactic or hydroxy-benzoic acid, and then to react the sodium derivative of such ester with the ester of a different alcohol listed in Table 2 and chloracetic or alpha-chlorpropionic acid, to form the ether linkage.

The polymerizable monomeric unsaturated compound may also consist of an ether of a molecule of ethylene glycol, propylene glycol, 1,2-butylene glycol, 2,3-butylene glycol or o-, m- or p-dihydroxy benzene with two similar or dissimilar molecules each consisting of an ester of glycolic, lactic or o-, m- or p-hydroxy benzoic acid with any of the alcohols listed in Table 2. Such a polymerizable monomeric carbon compound has the general formula

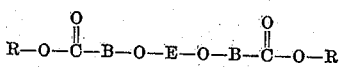

A compound having the general formula

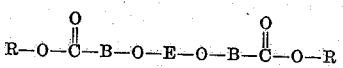

may be prepared by reacting one molecule of a sodium derivative of ethylene, propylene or a butylene glycol or of a hydroxy benzene with two molecules of an ester of chloracetic acid or alpha-chloropropionic acid with one of the alcohols listed in Table 2, in accordance with the usual procedure for preparing ethers. If an unsymmetrical compound having this general formula is desired, one molecule of the ester of chloracetic of alpha-chloropropionic acid may be reacted with one molecule of the sodium derivative and the product may then be reacted with one molecule of a different ester of such an acid. As an alternative method, one molecule of the dichloro or dibromo compound corresponding to ethylene, propylene or butylene glycol may be reacted with two molecules of the sodium derivative of the ester of glycolic, lactic or a hydroxy benzoic acid with one of the alcohols listed in Table 2.

The polymerizable monomeric compound may also consist of an ester of a molecule of silicic acid with four molecules of an ester of glycolic or lactic acid with any of the alcohols listed in Table 2. Such a polymerizable monomeric carbon compound has the general formula

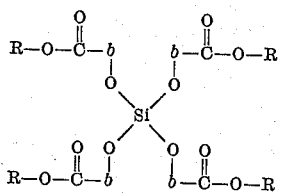

in which $b$ is methylene or methyl methylene and R has the same significance as before. Such compounds include tetra(allyl glycolate) silicate and tetra(allyl lactate) silicate.

In summary, choline chloride can be employed according to the principles set forth hereinabove to stabilize and/or initiate polymerization of any of the presently known polymerizable polyester compositions, as well as any compositions which contain such polyesters along with other ingredients including polymerizable ethylenically unsaturated monomeric substances, pigments, fillers, modifying resins, solvents, plasticizers, inhibitors, other stabilizers, polymerization catalysts, lubricants, etc. The formulation of compositions of such character forms no part of this invention and is of course well understood by those skilled in the polyester art. Accordingly, no extended discussion of these and many other incidental aspects of the art seems necessary in order to enable one to utilize the principles of our invention to their full advantage.

Having now described our invention, what we claim is:

1. As a novel composition of matter, a thermosetting composition comprising a polymerizable unsaturated alkyd resin whose molecule contains a plurality of polymerizably reactive $\Delta^{2,3}$-enedioyl groups, and a small amount of choline chloride dispersed therein.

2. A novel composition of matter as claimed in claim 1 which includes a small amount of a catalyst of the class consisting of organic peroxides, organic ozonides and mixtures thereof.

3. A novel composition as claimed in claim 2 which includes a liquid, ethylenically unsaturated compound copolymerizable with said unsaturated alkyd resin.

4. A novel composition as claimed in claim 1 which includes a liquid, ethylenically unsaturated compound copolymerizable with said unsaturated alkyd resin.

5. As a novel composition of matter, a thermosetting composition comprising (1) a polymerizable unsaturated alkyd resin whose molecule contains a plurality of polymerizably reactive $\Delta^{2,3}$-enedioyl groups and (2) a small amount of choline chloride partial ester in which choline chloride has been chemically combined with a single acyl radical of polycarboxylic acid through an ester linkage joining said acyl radical with that carbon atom of choline chloride which is beta to nitrogen in the

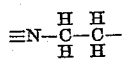

radical of choline chloride.

6. The method of treating a polymerizable unsaturated alkyd resin whose molecule contains a plurality of polymerizably reactive $\Delta^{2,3}$-enedioyl groups which comprises incorporating a small amount of choline chloride in said unsaturated alkyd resin.

7. The method of treating a polymerizable unsaturated alkyd resin whose molecule contains a plurality of polymerizably reactive $\Delta^{2,3}$-enedioyl groups which comprises incorporating in said unsaturated alkyd resin a small amount of choline chloride partial ester in which choline chloride has been chemically combined with a single acyl radical of polycarboxylic acid through an ester linkage joining said acyl radical with that carbon atom of choline chloride which is beta to nitrogen in the

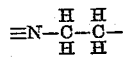

radical of choline chloride.

8. The method as claimed in claim 7, wherein polycarboxylic acid is maleic acid.

9. The method of preparing a stabilized, uncatalyzed, copolymerizable mixture comprising (1) a polymerizable unsaturated alkyd resin whose molecule contains a plurality of polymerizably reactive $\Delta^{2,3}$-enedioyl groups and (2) a liquid, ethylenically unsaturated compound copolymerizable with said unsaturated alkyd resin, which comprises: incorporating a small amount of choline chloride in said unsaturated alkyd resin and thereafter by means of heat combining the resulting mass with said ethylenically unsaturated compound to form a homogeneous solution stabilized against premature gelling in the course of at least several hours while exposed to temperatures of about 200° F.

10. The method as claimed in claim 9 wherein the choline chloride is introduced in the form of a choline chloride partial ester in which choline chloride has been chemically combined with a single acyl radical of polycarboxylic acid through an ester linkage joining said acyl radical with that carbon atom of choline chloride which is beta to nitrogen in the

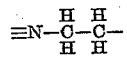

radical of choline chloride.

11. The method as claimed in claim 10 wherein the polycarboxylic acid is maleic acid.

12. The method of treating a polymerizable unsaturated alkyd resin whose molecule contains a plurality of polymerizably reactive $\Delta^{2,3}$-enedioyl groups, which comprises incorporating a small amount of choline chloride in said unsaturated alkyd resin along with a small amount of 4-t-butyl catechol.

References Cited in the file of this patent
UNITED STATES PATENTS 2,593,787   Parker _____ Apr. 22, 1953